United States Patent [19]

Spietschka et al.

[11] 3,888,841
[45] June 10, 1975

[54] PROCESS FOR DIAZOTIZING AROMATIC AMINES

[75] Inventors: Ernst Spietschka, Oberauroff, Taunus; Josef Landler, Hofheim, Taunus, both of Germany

[73] Assignee: Hoechst Aktiengesellschaft, Frankfurt, Germany

[22] Filed: July 10, 1972

[21] Appl. No.: 270,256

[30] Foreign Application Priority Data
July 10, 1971  Germany............................ 2134519

[52] U.S. Cl. ............................................. 260/141
[51] Int. Cl. .......................................... C07c 113/04
[58] Field of Search ................................... 260/141

[56] References Cited
UNITED STATES PATENTS
2,778,815   1/1957   Ackermann ........................ 260/141
3,615,578   10/1971  Hectors et al. ..................... 260/141

OTHER PUBLICATIONS
DeMilt et al, "Diazotization of Weakly Basic and Insoluble Amines. The Use of Pyridine, Quinoline and Isoquinoline as Solvent for the Amines," JACS, Vol. 58, pages 2044–2046. 1936.

"The Chemistry of Synthetic Dyes," Venkataraman, Ed., Vol III. Academic Press: New York. 1970. Page 239.

*Primary Examiner*—Lorraine A. Weinberger
*Assistant Examiner*—C. F. Warren
*Attorney, Agent, or Firm*—Curtis, Morris & Safford

[57] ABSTRACT

A process for diazotizing amines in organic solvents is shown. A solution or suspension of a diazotizable amine compound such as p-toluidine or 2-naphthylamine in an excess of a heterocyclic base which may be for example pyridine, quinoline, picoline, lutidine or mixtures thereof and which is inert toward the action of compounds capable of splitting off nitrosyl groups, is diazotized by contacting it with a compound capable of splitting off nitrosyl groups such as nitrosylsulfuric acid or nitrosyl chloride.

2 Claims, No Drawings

PROCESS FOR DIAZOTIZING AROMATIC AMINES

The present invention relates to a process for diazotizing amines.

It is known that various amines and the salts thereof raise difficulties in the diazotation reaction in an aqueous medium since they are sparingly soluble (cf. Houben Weyl (1965), vol. 10/3, page 28, Organic Reactions 9 (1957), page 434). To overcome these difficulties, it has been proposed to diazotize them in organic solvents, such as alcohols, ethers or ketones. For this purpose, it is necessary to add an aqueous solution of a nitrite and to develop nitrous acid therefrom by adding a strong mineral acid. The necessary addition of water, however, reduces the dissolution effect of the organic solvent. In order to avoid this, the required acid may be added in the form of a gas and the nitrous acid is developed from one of its esters, for example from amyl-nitrite. The disadvantage of this process is, on the one hand, the use of an ester of nitrous acid which is not easy to handle on an industrial scale and, on the other hand, the complicated separation of the mixture of solvents present, after the diazotation reaction is complete.

This invention now provides a process for diazotizing amines in organic solvents, which comprises diazotizing the amine in an excess amount of a heterocyclic base by adding an agent capable of splitting off nitrosyl groups.

The process of the invention is carried out by dissolving or suspending the amines to be diazotized, depending on their solubility, in an excess of a heterocyclic base and then adding molar amounts of a compound capable of splitting off nitrosyl groups, such as nitrosylsulfuric acid or nitrosyl chloride.

As heterocyclic bases, there are used compounds which are inert toward the action of compounds capable of splitting off nitrosyl groups, for example pyridine, quinoline, picoline, lutidine or similar bases or mixtures thereof. These bases are added in amounts depending on the solubility of the amine to be diazotized and on further reactions intended after the diazotation reaction. Generally, 5 to 10 times the amount of bases are sufficient. At any event, the amount of base is such that, even after addition of the compound capable of splitting off nitrosyl groups, the reaction mixture does not become acidic.

The diazotation reaction itself is carried out at temperatures of from $-15°$ to $+10°C$.

It is, of course, also possible to introduce the amine to be diazotized into the mixture of heterocyclic base and of compound capable of splitting off nitrosyl groups.

As amines to be diazotized according to the process of the invention, there are generally used amines which do not carry strongly negative substituents, for example alkyl-anilines, alkoxy-anilines and also higher fused systems.

It is surprising that, under the reaction conditions mentioned, diazotation is brought about since no free nitrous acid can be detected in the reaction batch as a sample of the mixture diluted with water does not bring any reaction on potassium iodine starch paper. Moreover, it was known (cf. J. Am. Chem. Soc. 58 (1936), page 2044) that, when pyridine is used as solvent, the amine to be diazotized has first to be dissolved in this base and then this solution has to be added to an excess amount of an acid in order to bring about diazotation.

Compared to known diazotation methods in organic solvents, the process of the invention has the following advantages. Except the water necesarily formed during diazotation, no additional water is dragged into the reaction medium so that practically the full dissolution power of the organic base is preserved. Moreover, only a single component has to be added for the diazotation, so that the heterocyclic base can easily be regenerated by distillation, since further solvents are neither added nor formed during the reaction. When diazotation is complete, the reaction mixture can furthermore be used directly for such subsequent reactions of the diazonium compound as have to be carried out in a neutral or alkaline range, since no excess acid has to be neutralized.

The following Examples serve to illustrate the invention, the parts and percentages being by weight unless stated otherwise.

EXAMPLE 1

10.7 Parts of p-toluidine were introduced into 100 parts of a technical-grade pyridine base mixture (composition: 70 % of pyridine, 26 % of methyl-pyridine, 4 % of dimethyl-pyridine), and about 37 parts of nitrosyl-sulfuric acid (42%) were added dropwise while stirring at $-10$ to $0°C$. Stirring was continued until the reaction was complete.

A similar good result was obtained by adding nitrosyl-sulfuric acid, while cooling, to the pyridine base mixture and then introducing p-toluidine.

EXAMPLE 2

14.3 Parts of 2-naphthylamine were dissolved in 350 parts of pyridine and about 37 parts of nitrosyl-sulfuric acid (42%) were slowly added while stirring at $0° - 10°C$. In the same manner, nitrosyl chloride could also be used for the diazotation.

EXAMPLE 3

About 37 parts of nitrosyl-sulfuric acid (42%) were slowly added while stirring, at $-10°C$, to 10.7 parts of p-toluidine in 100 parts of quinoline, and stirring was continued until the reaction was complete.

We claim:

1. A process for diazotizing a diazotizable amine compound which consists of the steps of: dissolving or suspending a diazotizable amine compound which does not carry a strongly negative substituent in an excess of a heterocyclic base inert toward the action or compounds capable of splitting off nitrosyl groups, selected from the group consisting of pyridine, quinoline, picoline, lutidine and mixtures thereof; and diazotizing the said diazotizable amine compound at a temperature of from $-15°C$ to $10°C$ and in the absence of acid conditions with a compound capable of splitting off nitrosyl groups selected from the group consisting of nitrosyl-sulfuric acid and nitrosyl chloride.

2. A process as recited in claim 1 wherein said heterocyclic base is used in from 5 to 10 times the amount of said diazotizable amine compound.

* * * * *